INVENTORS
ARCHIBALD R. SINCLAIR
JAMES M. RUSSELL, III

United States Patent Office 3,397,318
Patented Aug. 13, 1968

3,397,318
ABLATION SENSOR
Archibald R. Sinclair, Hampton, and James M. Russell III, Newport News, Va., assignors to the United States of America as represented by the Administrator of the National Aeronautics and Space Administration
Filed June 9, 1965, Ser. No. 462,763
3 Claims. (Cl. 250—227)

ABSTRACT OF THE DISCLOSURE

A sensor for measuring the rate of ablation and the temperature of an ablation material on the surface of a vehicle reentering the atmosphere from space. Light pipes are embedded in the surface of the ablation at various levels. When the ablation material burns to the successive levels of the light pipes, the incandescence of the burning is conveyed through the light pipes to photo-sensors whose outputs are indicative of the burning rate. Calibration of the output also provides a temperature reading at the area of charring.

---

The invention described herein may be manufactured and used by or for the Government of the United States of America for governmental purposes without the payment of any royalties thereon or therefor.

This invention relates generally to an ablation sensor and more specifically concerns an ablation sensor that will accurately and reliably measure the surface ablation rate of an ablation material during reentry into the earth's atmosphere or during entry into the atmospheres of other planets.

Previous ablation sensors that monitor surface ablation rate are the variable capacitance sensor, the breakwire sensor, the thermocouple sensor, and the radioactive sensor. The variable capacitance ablation sensor is a concentric cylinder capacitor oriented so that the axis of the cylinder is perpendicular to the ablation surface. As the material surface recedes, the height of the concentric cylinder decreases at the same rate thereby changing the area of the capacitor plates and thus varying the capacitance. This device has the disadvantage that it can be used only in noncharring ablators. Its operation in a charring ablation material is undesirably affected by a short circuit of the capacitor plates by the highly conductive char layer. Also, its operation in noncharring ablation materials is significantly hampered due to a shunting effect caused by the finite resistance of the ionized gas layer surrounding a reentry body.

The breakwire ablation sensor utilizes a series of fine wires stepped in depth in the ablation material. When the material surface recedes to the level of the first wire, the wire burns thereby interrupting its continuity. As the surface ablates to the levels of the successive wires, similar occurrences result thus providing means for making ablation rate measurements. However, the formation of a char layer interface short circuits the wires so that any break in wire continuity occurring about this interface cannot be sensed by circuitry. Attempts to eliminate this problem by electrical insulation are impaired by the high temperatures that the insulation must withstand near the ablation surface. Also, wires embedded in the material introduce heat conductors that conduct heat from the hot ablation surface to a remote point below the surface and cause internal degradation of the material integrity.

A rather crude technique for measuring the rate of surface ablation employs a series of thermocouples stepped in depth in the ablation material. When a thermocouple is exposed to the material surface, a distinct change in thermocouple output occurs. As each successive thermocouple is exposed to the surface, a similar occurrence results thereby providing means for making ablation rate measurements. The electrical conductivity of the char layer in a charring ablator poses the same problems with this technique as those encountered with the other electrical methods described. In addition, the thermocouple output at the higher temperatures becomes erratic thus making the selection of a distinct point on the output curve difficult.

The radioactive ablation sensor employs radioactive isotopes inserted in the ablation material. This sensor is based on the premise that the radioactive particles will burn away at the same rate at which the material surface recedes, causing the total radiation count to diminish at a proportional rate. The radioactive sensor has several disadvantages, not the least of which are the hazards involved in handling radioactive isotopes. Also, the probability of procuring an isotope that does not gas-off or vaporize before the hot material surface reaches it, is questionable. In addition, this sensor necessitates the use of a rather complex detecting system requiring a high voltage power supply.

It is therefore an object of this ivention to provide an ablation sensor that will accurately and reliably measure the rate of surface ablation of an ablation material.

Another object of this invention is to provide an ablation sensor for measuring the surface ablation rate of a charring ablation material that is not affected by the char layer.

A further object of this invention is to provide an ablation sensor for measuring the surface ablation rate of an ablation material during reentry into the earth's atmosphere that is not affected by the finite resistance of the ionized gas layer surrounding the reentry body.

Still another object of this invention is to provide an ablation sensor that does not have good heat conductors which could conduct heat from the hot ablation surface to a remote point below the surface and cause internal degradation of the material integrity.

A still further object of this invention is to provide an ablation sensor which produces an electrical output that does not becomes erratic at the high temperatures of the ablation material.

The present invention consists essentially of an optical light pipe such as a small rod of transparent material and a photo-sensor. The photo-sensor is located such that it will receive all of the light transmitted by the optical light pipe. The optical light pipe and the photo-sensor are embedded in the ablation material. When the ablation process occurs, the glowing material above the light pipe becomes a source of radiation. As this area moves in the direction of the receiving end of the light pipe, the light transmitted to the photo-sensor increases slowly. When the light pipe is exposed to the ablation surface, a sharp increase in light intensity occurs either from the ablation material or the flowing end of the light pipe resulting in a rapid increase in the sensor output signal. This yields a distinct point on the sensor output curve that can be used to correlate surface position with time. A series of these sensors stepped in depth in the ablation material provides means for making ablation rate measurements. An infrared rejection filter can be placed between the light pipe and photo-sensor. The incorporation of this filter will yield an improvement of measurement accuracy in charring ablators. The distribution of the light in the radiation area goes from red hot at the char-non-char interface to white hot (shorter wave length) at the ablation surface. The addition of the filter requires that the sensor be illuminated with a higher (shorter wave length) light intensity before any appreciable light sensor signal is recorded. Hence, the measurement accuracy is improved because now the photo-sensor signal is delayed so that the material surface is nearer the end of the light pipe before the change in slope of the sensor signal versus time current occurs.

Other objects and advantages of the invention will further become apparent hereinafter and in the drawings, in which.

Figure 1:
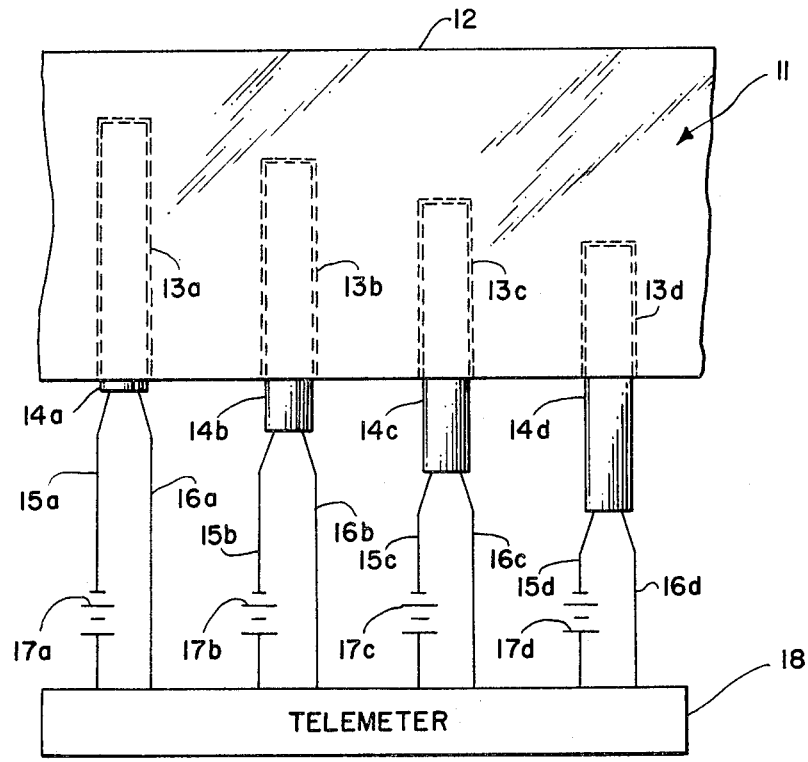
FIG. 1 is a schematic diagram of this invention.

In describing the preferred embodiment of the invention illustrated in the drawings, specific terminology will be resorted to for the sake of clarity. However, it is not intended to be limited to the specific terms so selected and it is to be understood that each specific term includes all technical equivalents which operate in a similar manner to accomplish a similar purpose.

Turning now to the specific embodiment of the invention selected for illustration in the drawings, the number 11 designates generally a piece of ablation material whose ablation rate is to be measured. A surface 12 is the ablating surface of the ablation material. Opposite surface 12 there are several holes 13a, 13b, 13c, and 13d drilled into the ablation material 11. Each of these holes is drilled to a different depth. An identical sensor plug 14 is inserted into each of the holes 13: sensor plugs 14a, 14b, 14c and 14d are inserted into holes 13a, 13b, 13c and 13d, respectively. One of the sensor plugs 14 will be described in detail in FIG. 2. Each of the sensor plugs 14 is electrically a resistor which changes in resistance in accordance with the intensity of the light at the upper end of the plug. This resistance is connected across a wire 15 and a wire 16 with wire 15 having a voltage source 17 in it. Wires 15 and 16 are connected to a telemeter 18 which transmits the voltage levels across the two wires to a ground station. When surface 12 recedes to the upper end of one of the holes 13, the light sensed by the corresponding sensor 14 increases abruptly causing its resistance to decrease abruptly. Consequently, the voltage to the telemeter 18 increases abruptly. Since the depth of each hole 13 is known and since the time at which the corresponding abrupt voltage change to telemeter 18 can be determined the ablation rate of surface 12 can be determined. Since the sensor output is continuous, a calibration of temperature at the end of the light pipe would provide a parallel use for the sensor signal. The prime advantage offered by this sensor operated in such a mode is accurate and reliable measurement of high temperatures (3700° F. region) in a reentry environment and greater sensor output at the maximum temperature encountered (5 volts with no amplification). Even though only four sensing circuits are shown, any desired number can be used.

Figure 2:
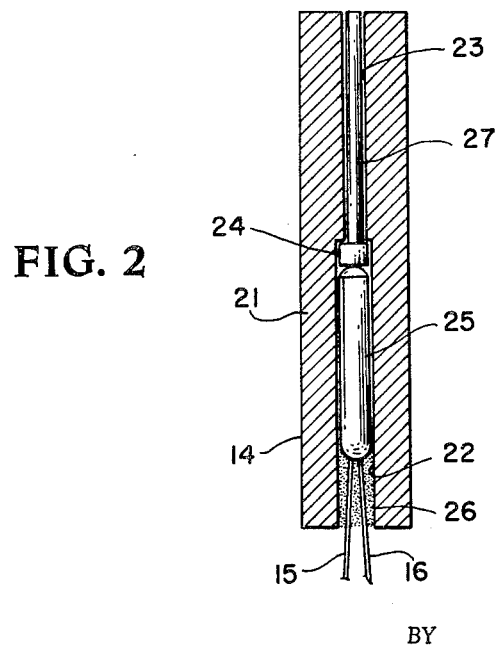
FIG. 2 is a cross-sectional view of a single sensor plug that can be used as the sensors in FIG. 1.

A cross-sectional view of one of the sensor plugs 14 in FIG. 1 is shown in FIG. 2. The other cross-section of a sensor plug 14 is preferably circular; however, it can be any other shape without departing from the spirit or scope of this invention. The sensor plug 14 consists of a plug of ablation material 21 with a relatively large hole 22 drilled in it to a predetermined depth and then a smaller hole 23 drilled in it onto its other end. An infrared rejection filter 24 is fitted into hole 22 to said predetermined depth, and a photodiode 25 it fitted into hole 22 against filter 24. A suitable potting compound 26 is inserted into hole 22 to hold filter 24 and photodiode 25 in place. A light pipe 27 is inserted into hole 23 against filter 24. Light pipe 27 is a slender optical fiber or bundle of fibers constructed of a material such as fused silica or sapphire that is capable of withstanding high temperatures. The light at the upper end of light pipe 27 is transmitted through the light pipe and filter 24 to photodiode 25 which produces a resistance change across wires 15 and 16 that is related to the magnitude of the light. This invention is operable without filter 24; however, filter 24 improves the accuracy of the invention when used with charring ablators since an appreciable amount of infrared radiation appears at the top end of light pipe 27 prior to the ablating surface reaching that point. Also, another photo-sensitive devices that will produce resistance or voltage changes can be used in place of photodiode 25 without departing from this invention.

Figure 3:
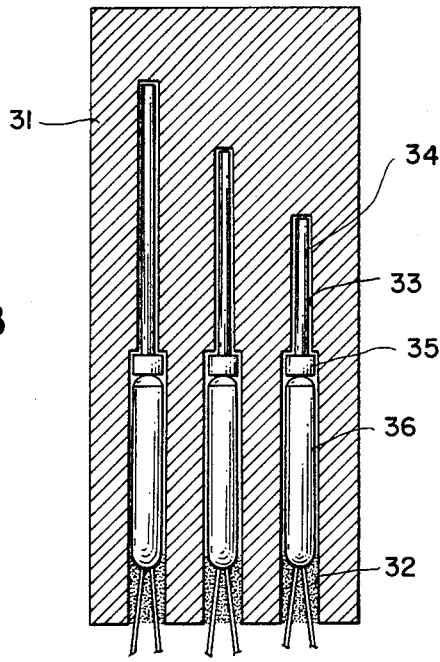
FIG. 3 is a cross-sectional view of a multiple sensor plug.

In FIG. 3 there is shown a cross-sectional view of a multiple sensor plug that can be used instead of the sensor plug shown in FIG. 2. The sensor plug in FIG. 3 consists of a plug of ablation material 31 in which a plurality of relatively large diameter equal depth holes 32 are drilled. Then at the end of each of these holes 32, a smaller diameter hole 33 is drilled to a different predetermined depth. A light pipe 34 is inserted into each of the holes 33, and an infrared filter 35 and a photodiode 36 are inserted into each of the holes 32. Any number of sensors can be embedded in one plug and they do not have to be in the same plane. This plug is then installed in a hole that is drilled all the way through ablation material 11. The sensors in FIG. 3 operate in the same manner as the sensor in FIG. 2.

Figure 4:
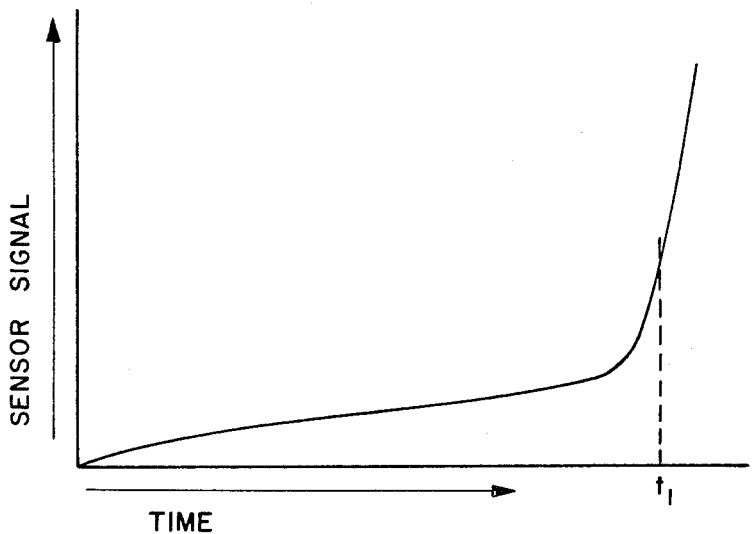
FIG. 4 is a sensor signal versus time curve for one of the sensors in FIG. 1.

The operation of this invention will now be described while referring to FIG. 4. As the surface 12 in FIG. 1 recesses, each of the sensor plugs 14 will produce an output in accordance wtih the curve shown in FIG. 4. Before the ablation surface reaches a sensor 14, the sensor will produce an output from the radiation existing in the glowing material. This radiation strikes light pipe 27 which passes it through filter 24 to photodiode 25 causing the sensor to produce an output. When the receding surface reaches the end of the sensor 14 at a time $t_1$, the sensor will produce an abruptly larger output indicating that the surface has receded to a known depth. Since there are many of these sensors 14 at different predetermined depths in the material 11, the rate of recession of the ablation material 11 can be determined. The outputs from the different sensors 14 are applied to a telemeter 18 to be transmitted to earth.

The advantages of this invention are that the ionized gas layer and the electrical conductivity of the char layer have no effect upon the operation of the sensors 14; that the light pipe material has a low thermal conductivity and small mass and thus has little effect on the physical properties of the ablation material; that the sensor is small and compact and requires a minimum of electronic circuitry; and that there are no hazards involved in handling the sensors since their components are passive in nature.

It is to be understood that the form of the invention herewith shown and described is to be taken as a preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the following claims.

What is claimed as new and desired to be secured by Letters Patent of the United States is:

1. An ablation sensor for sensing when the ablating surface of an ablation material has recessed to a predetermined level comprising: a hole in said ablation material having a depth to said predetermined level; a plug of ablation material fitted into said hole; a light pipe having a melting temperature similar to that of charring ablation material embedded in said plug such that one of its ends is located at said predetermined level; photosensor means embedded in said plug and located at the other end of said light pipe for producing a signal related to the amount of light transmitted through said light pipe; and an infrared rejection filter located between said light pipe and said photo-sensor whereby when said ablation material recesses to said one end of said light pipe, said photo-sensor means produces an abrupt change in output thereby indicating that said ablation material has recessed to said predetermined level.

2. A plurality of ablation sensors for sensing when the ablating surface of an ablation material has recessed to each of a plurality of predetermined levels and for measuring temperatures at these levels comprising: a hole in said ablation material; a plug of ablation material fitted into said hole; a plurality of elongated light pipes embedded in said plug with one end of each light pipe located at a different one of said predetermined levels; and photo-sensor means for each light pipe located at the other end of the light pipe and embedded in said plug for producing a signal related to the amount of light transmitted through the light pipe whereby when said ablation material recesses to said one end of each of said light pipes the corresponding photo-sensor means produces an abrupt change in output thereby indicating when said ablation material has recessed to each of said predetermined levels and the temperature at the various levels.

3. A device for measuring the temperature of an ablating material at a predetermined level in the ablating material comprising: an elongated light pipe embedded in in the ablating material such that one of its ends is located at said predetermined level; and photo-sensor means located at the other end of said light pipe for producing a signal related to the amount of light transmitted through said light pipe whereby the output of said photo-sensor means is indicative of the temperature at said predetermined level.

References Cited
UNITED STATES PATENTS

| | | | |
|---|---|---|---|
| 2,737,644 | 3/1956 | Krieger | 250—222 X |
| 2,840,145 | 6/1958 | Ator | 250—217 X |
| 2,977,479 | 3/1961 | Lauer | 250—217 X |
| 3,227,032 | 1/1966 | Upton | 350—96 |
| 3,315,081 | 4/1967 | Williams | 250—222 X |
| 3,201,973 | 8/1965 | Fritzgerald et al. | 350—96 X |

RALPH G. NILSON, *Primary Examiner.*

M. A. LEAVITT, *Assistant Examiner.*